March 17, 1970  F. G. OESS  3,500,520
METHOD OF OBTAINING APERTURE ALIGNMENT IN AN
ELECTRON GUN CONSTRUCTION
Filed Jan. 2, 1968
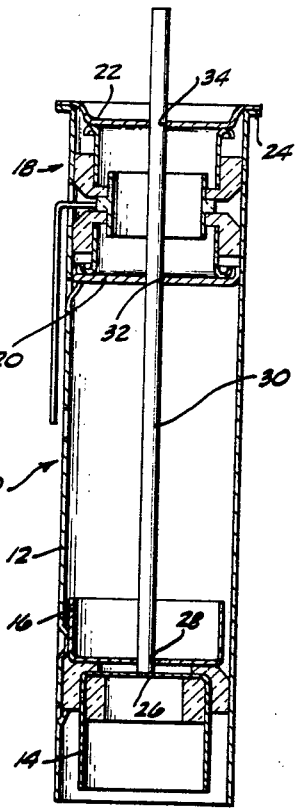
FIG. 1.
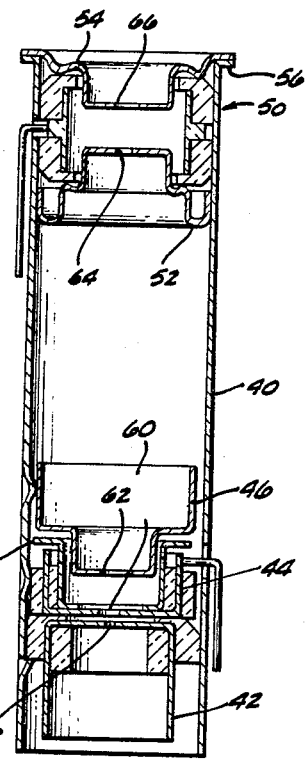
FIG. 2.
FIG. 3.
INVENTOR.
FREDERICK G. OESS,
BY
ATTORNEY.

United States Patent Office 3,500,520
Patented Mar. 17, 1970

3,500,520
METHOD OF OBTAINING APERTURE ALIGNMENT IN AN ELECTRON GUN CONSTRUCTION
Frederick G. Oess, Oceanside, Calif., assignor to Hughes Aircraft Company, Culver City, Calif., a corporation of Delaware
Filed Jan. 2, 1968, Ser. No. 695,079
Int. Cl. H01j 9/18
U.S. Cl. 29—25.16       3 Claims

ABSTRACT OF THE DISCLOSURE

A method of obtaining precise alignment electron gun limiting and exit apertures is disclosed. The limiting aperture plate is permanently assembled to the gun cylinder and the cap plate is loosely positioned in place. A straight mandrel having sized diameters positioned in an electrode aperture and the limiting and cap apertures. The mandrel is rotated to achieve alignment of the electrode, limiting and cap apertures. The cap aperture is then secured to the cylinder.

---

The invention relates to a method of obtaining high precision aperture alignment during electron gun fabrication.

It is well known to those skilled in this art that electron guns are constructed of various configurations, depending upon the prospective service application. However, certain features are common to a wide variety of electron guns, one of which is the existence of a plurality of in-line apertures in various aspects of the gun to accommodate passage of the electron beam. For example, a typical gun is provided with G1 and G2 electrodes carried adjacent one end of a supporting cylinder and in close juxtaposition to the electron producing cathode. Each of said electrodes has an aperture centrally thereof to accommodate electron beam passage. Electron guns of this structural type characteristically have a focus aspect at the opposed gun end which incorporates structure to provide an electrostatic field to accomplish beam formation and includes a beam defining plate having a limiting aperture therein, as well as a cap plate having a final aperture through which the electron beam emerges. A gun of the described type is frequently called a triode gun in view of the fact that it includes a cathode, a G1 and G2 electrodes.

Another common gun structure is that type known as the tetrode gun which, in addition to the electrode and focus structure above described, includes a third electrode mounted in the area of the G1 and G2 electrodes and called a G3 electrode which is also provided with a central aperture to accommodate electron beam passage.

Experience has shown that proper alignment of the apertures through which the electron beam passes is of critical importance in efficient electron gun operation and in the focus of the electron beam in the device to which the electron gun is applied, for example, a cathode ray tube. Because of the extremely small size of the electron gun components, as well as the relatively delicate structure of various components, it has been found extremely difficult to obtain proper aperture alignment during the electron gun fabrication. In addition, it is believed that aperture misalignment may occur during operation as a result of subjection to a wide range of environmental temperature variations, as well as mechanical shock and vibration.

Accordingly, it is a primary object of the invention to provide a method of fabrication adapted to secure precision alignment between the various fixed apertures in the electron gun.

It is yet a further object of the invention to provide a method of checking aperture alignment in fully fabricated guns such as, for example, a gun that is experiencing focus difficulties in operation.

The herein disclosed aperture alignment method is particularly adaptable to a gun structure such as that disclosed in my co-pending application entitled "Electron Gun Electrode Mounting Arrangement and Method of Fabrication," filed on instant dates herewith. Further, the method of achieving aperture alignment as herein disclosed has particular utility in providing proper alignment for the limiting and final apertures normally associated with the focus section of the gun when combined with the method of obtaining electron gun aperture alignment as disclosed in my co-pending application entitled "Electron Gun Alignment Method and Device Therefor," also filed on instant date herewith.

These and other features of the invention will become apparent in the course of the following description and from an examination of the related drawings, wherein:

FIGURE 1 is a partially fragmentary vertical sectional view of a triode gun with an alignment mandrel in position;

FIG. 2 is a vertical sectional view of a typical tetrode gun having apertures of varying size; and FIG. 3 is a side elevational view of an alignment mandrel that may be employed with the structure of FIG. 2 to achieve aperture alignment.

Describing the invention in detail and directing attention to FIG. 1, a sectional view of an electron gun is indicated generally at 10. The gun 10 comprises an outer supporting cylinder 12 having a G1 electrode structure 14 and a G2 electrode structure 16 positioned in close juxtaposition at the lower aspect of the cylinder 12. Focus structure is indicated generally at 18 at the upper aspect of the tube and comprises, in addition to structure to provide a desired appropriate electrostatic field, a lower or limiting aperture plate 20 and a cap plate 22 closing of the gun cylinder. In final assembled configuration the cap plate 22 is welded to the flared flange 24 of the cylinder 12.

In order to best understand the herein disclosed invention attention is again directed to my second mentioned co-pending application which describes a method of obtaining precision alignment between the G1 electrode 14 and the G2 electrode 16. It will be assumed therefore that the apertures 26 and 28 of the G1 and G2 electrodes, respectively, have been appropriately aligned by using the method described in said referenced patent application.

A precision diameter mandrel 30 is provided having a diameter at its lower aspect which will closely telescopically fit within the aperture 28 of the G2 electrode 16. The beam limiting plate 20 is provided with an aperture 32, again having a diameter closely approximating the diameter of precision mandrel 30. Cap plate 22 is also provided with an aperture 34, the latter having the diameter closely approximating the diameter of the precision mandrel 30.

During gun construction and after assembly of the G1 electrode 14 and G2 electrode 16, the limiting aperture plate 20 is positioned within cylinder 12 and affixed thereto in any conventional manner as, for example, by spot-welding. The focus electrode structure 18 is then assembled to the cylinder 12.

Cap plate 22, however, initially is not secured to the cylinder 12. The precision mandrel is first telescopically inserted into aperture 32 and aperture 28 which is easily accomplished because two spaced identical holes or apertures in generally parallel plates are involved. Thereafter, plate 22, and particularly exit aperture 34, is positioned over the mandrel 30 to loosely abut the flange 24. Mandrel 34 is manually rotated which will accurately align aperture 34 with previously aligned apertures 28 and 32. When this initial alignment is completed, cover plate 22 is mechanically clamped to the flange 24 and the mandrel 30 is manually raised upwardly to extract its lower end from aperture 28. If proper alignment has been achieved the mandrel 30, upon manual release thereof in its raised position, will move downwardly by gravity and re-enter aperture 28. If it does not re-enter aperture 28 during free fall it must be assumed that aperture 34 has not been properly aligned and the above procedure must be repeated. Alternately, if the mandrel 30 re-enters aperture 28 during free fall under its own weight, alignment of apertures 34, 32 and 28 has been assured and plate 22 may be permanently spot-welded to flange 24.

Additionally, the straightness of the mandrel 30 may be checked by removing its lower tip from aperture 28, rotating the mandrel and determining if it will re-enter aperture 28. If upon rotation it will not re-enter aperture 28, it must be assumed that the mandrel 30 is not sufficiently straight and should be replaced.

Attention is directed to FIGS. 2 and 3 which illustrate a typical tetrode gun having apertures of varying diameters. The typical gun structure again comprises an outer cylinder 40, a G1 electrode structure 42, G2 electrode structure 44 and G3 electrode structure 46. A shielding dish 48 is interposed between the G1 electrode and the G2 electrode. As shown in the figure, all of the described electrode structure is adjacent the lower aspect of the gun cylinder 40.

At the upper aspect of the supporting cylinder 40 focusing structure is provided and indicated generally at 50.

The focus structure 50 is bracketed, on opposed sides thereof, by a lower limiting aperture plate 52 and an upper cap plate 54. In the completed assembly the cap plate 54 is spot welded to the radially extending flange 56 of the cylinder 40.

Again, it will be assumed that the G1, G2 and G3 electrodes at the lower aspect of the tube have had their respective apertures 58, 60 and 62 brought into proper and precise alignment in accordance with the method suggested in my second referenced patent application. As shown in FIG. 2, the limiting aperture plate 52 is provided with a central aperture 64 and the cap plate 54 is provided with a central aperture 66. As in the prior embodiment, after assembly of the electrode structure to the cylinder 40, plate 52 is positioned in proper location at the upper aspect of the cylinder 40 and spot welded thereto for secure mounting.

After assembly of the limiting aperture plate 52 and spot welding to the cylinder 40, the focus structure 50 is assembled. Again, as in the first embodiment, cap plate 54 is loosely positioned against flange 56 of cylinder 40.

Attention is directed to FIG. 3 which illustrates a precision mandrel which may be used to accomplish aperture alignment. It is noted that the mandrel of FIG. 3 is stepped to provide 3 different diameters. From its lower aspect diameter D1 has been turned to provide a precise fit into the aperture 58 of G1 electrode 42. Diameter D2 has been provided with a diameter to offer a precise fit in limiting aperture 64 of plate 52. Diameter D3, on the other hand, has been sized to provide a precise fit into aperture 66 of cap plate 54.

Mandrel 70 is initially positioned within the cylinder 40 so that diameter D1 telescopically enters aperture 58 of G1 electrode 42. This brings diameter D2 into precise fit with aperture 64 of plate 52. Cap plate 54 is then positioned to overlie flange 56 with its central aperture 66 receiving diameter D3 of mandrel 70.

The mandrel is manually rotated to bring aperture 66 into precise alignment with apertures 58 and 64 and then mechanically clamped to flange 56. Again, the mandrel may be manually raised to extract diameter D1 from aperture 58 and D1 allowed to gravity free-fall downwardly. If diameter D1 smoothly enters aperture 58 a precise alignment of aperture 66 has been achieved and welding of plate 54 to flange 56 may be accomplished. Of course, the mechanical clamps are removed after welding.

Again, and as in the first embodiment, once gravity alignment has been achieved the mandrel 70 may be manually rotated and again allowed to free-fall and if diameter D1 easily enters aperture 58 under its own weight in various angular mandrel positions it may be assumed that the mandrel 70 is straight. On the other hand, if in one or more positions the mandrel 70 and diameter D1 will not re-enter aperture 58 under its own weight, it may be assumed that the mandrel is not straight and it must be discarded and replaced with a new test mandrel.

As noted above, precise aperture alignment is an important factor in the proper operation of an electron gun, as well as effecting proper focus of the electron beam in any operational device such as a cathode ray tube. Utilizing the mode of construction herein described the initial precise alignment is readily achievable thereby enhancing electron gun operation. It will also be apparent that the aligning mandrel method described may be utilized to check the alignment of the apertures in any gun that has been in service. For example, if an operating electron gun appears to be having focus problems the gun may be partially disassembled and aperture alignment quickly checked using the described method to determine if improper aperture alignment is the source of focus difficulty.

While several examples of mandrel configurations have been shown, it will be apparent that the method herein described may be used to align series of apertures of varying diameters, it being only necessary to provide a mandrel having an appropriate sized diameter to accommodate the precise alignment of the various apertures.

The invention as disclosed is by way of illustration and not limitation and may be subject to various modifications, all within the spirit and scope thereof.

What is claimed is:

1. In a method of obtaining aperture alignment in an electron gun comprising a plurality of electrodes at one end of the gun, each having an electrode aperture therein and a limiting and final aperture at the other end of the gun, the steps of providing a mandrel having segments dimensioned to the diameters of the respective apertures, inserting the mandrel in the electrode aperture and limiting aperture prior to securing the final aperture plate to the gun, positioning the final aperture plate in position at the end of the gun with the final aperture receiving the mandrel, temporarily securing the final aperture plate to the gun, raising the mandrel out of the electrode apertures and allowing it to re-enter the electrode aperture, repeating the raising and lowering step with the mandrel rotated in various angular positions, and permanently securing the end plate to the gun when the mandrel may be removed and re-entered in the electrode apertures in various angular positions thereof.

2. A method of obtaining aperture alignment in an electron gun according to claim 1 wherein the mandrel is provided with diameters along its length of varying size, the smallest of which is adapted to be received within an electrode aperture.

3. A method of obtaining aperture alignment in an electron gun, said gun comprising a plurality of plates distributed along the internal aspect of an outer supporting cylinder, the plates having electron passing apertures centrally thereof, the steps of providing one of said plates in loose, nonfixed association with the cylinder, providing a mandrel dimensioned to the diameters of the respective apertures, inserting the mandrel in the respective apertures, then temporarily securing said loose plate to the cylinder, raising the mandrel out of several of said apertures and allowing it to re-enter the respective apertures by gravity, said raising and lowering steps including sequentially rotating the mandrel to various angular positions, and permanently securing the loose plate to the cylinder when the mandrel may be removed and re-entered in the apertures in all angular positions thereof.

References Cited

UNITED STATES PATENTS

| | | | |
|---|---|---|---|
| 2,374,546 | 4/1945 | Laico | 29—25.16 XR |
| 2,423,924 | 7/1947 | Augenstein et al. | 29—25.16 XR |
| 3,327,371 | 6/1967 | Kerns et al. | 29—467 |
| 3,399,440 | 9/1968 | Blumenberg et al. | 29—25.16 |

JOHN F. CAMPBELL, Primary Examiner

R. B. LAZARUS, Assistant Examiner

U.S. Cl. X.R.

29—468